United States Patent
Wang et al.

(10) Patent No.: US 11,310,421 B2
(45) Date of Patent: Apr. 19, 2022

(54) DAY-MODE-NIGHT-MODE SWITCHING METHOD AND RELATED MONITORING CAMERA APPARATUS

(71) Applicant: VIVOTEK INC., New Taipei (TW)

(72) Inventors: Hsiang-Sheng Wang, New Taipei (TW); Shih-Hsuan Chen, New Taipei (TW)

(73) Assignee: VIVOTEK INC., New Taipei (TW)

(*) Notice: Subject to any disclaimer, the term of this patent is extended or adjusted under 35 U.S.C. 154(b) by 0 days.

(21) Appl. No.: 17/105,653

(22) Filed: Nov. 27, 2020

(65) Prior Publication Data

US 2021/0195108 A1  Jun. 24, 2021

(30) Foreign Application Priority Data

Dec. 20, 2019 (TW) ................. 108146948

(51) Int. Cl.
*H04N 5/232* (2006.01)
*H04N 5/235* (2006.01)

(52) U.S. Cl.
CPC ....... *H04N 5/23245* (2013.01); *H04N 5/2351* (2013.01); *H04N 5/2353* (2013.01)

(58) Field of Classification Search
CPC ............. H04N 5/23245; H04N 5/2353; H04N 5/2351; H04N 5/2254; H04N 5/2354; H04N 5/2256; H04N 5/2352; H04N 5/33; H04N 5/332
See application file for complete search history.

(56) References Cited

U.S. PATENT DOCUMENTS

| | | | |
|---|---|---|---|
| 2011/0193967 A1* | 8/2011 | Matsumoto | H04N 5/2352 348/164 |
| 2018/0120661 A1* | 5/2018 | Kilgore | G03B 11/00 |
| 2019/0174043 A1* | 6/2019 | Wang | H04N 5/2351 |
| 2019/0327416 A1* | 10/2019 | Duran | H04N 5/232 |
| 2019/0364187 A1* | 11/2019 | Kawasaki | H04N 5/2351 |
| 2020/0104566 A1* | 4/2020 | Yamada | H04N 5/2353 |

FOREIGN PATENT DOCUMENTS

| | | |
|---|---|---|
| CN | 103702038 A | 4/2014 |
| CN | 108377340 A | 8/2018 |

* cited by examiner

*Primary Examiner* — Albert H Cutler
(74) *Attorney, Agent, or Firm* — Winston Hsu

(57) ABSTRACT

A day-mode-night-mode switching method is applied to a monitoring camera apparatus or a filter switching module. The monitoring camera apparatus is electrically connected to an supplemental lighting apparatus for light compensation. The day-mode-night-mode switching method can include acquiring an equivalent exposure parameter of the monitoring camera apparatus, determining whether the equivalent exposure parameter conforms to a first mode switching condition when the monitoring camera apparatus is in a night mode, computing a light compensation exposure parameter of the monitoring camera apparatus when the equivalent exposure parameter conforms to the first mode switching condition, utilizing a compensation parameter acquired by the light compensation exposure parameter to transform the equivalent exposure parameter into a predicted exposure parameter, and switching modes of the monitoring camera apparatus according to a determination of the predicted exposure parameter and the first mode switching condition.

16 Claims, 5 Drawing Sheets

DAY-MODE-NIGHT-MODE SWITCHING METHOD AND RELATED MONITORING CAMERA APPARATUS

BACKGROUND OF THE INVENTION

1. Field of the Invention

The present invention relates to a day-mode-night-mode switching method and a related monitoring camera apparatus, and more particularly, to a day-mode-night-mode switching method and a related monitoring camera apparatus capable of matching with all kind of environment.

2. Description of the Prior Art

A conventional monitoring apparatus has an ambient light sensor (ALS) adapted to detect intensity of environmental brightness for determining whether to switch the monitoring apparatus in to a day mode or a night mode; however, the ambient light sensor (ALS) may make an erroneous judgment in some specific conditions. For example, if the monitoring apparatus is disposed under and shelter by the eaves of building, the ambient light sensor (ALS) misjudges the intensity of environmental brightness and switches the monitoring apparatus into the night mode even when the monitoring apparatus is in the sunny day, and a supplemental light source of the monitoring apparatus is actuated to provide light compensation; because the condition has sufficient intensity of environmental brightness, image content acquired by the monitoring apparatus is affected and distorted by the supplemental light source. When the conventional monitoring apparatus is in the night, the monitoring apparatus may be irradiated by a lamp of the vehicle, so that the ambient light sensor (ALS) may misjudge the intensity of environmental brightness and switch the monitoring apparatus into the day mode; meanwhile, the supplemental light source of the monitoring apparatus is shut down to make the image content lose details because of insufficient illumination. Thus, the ambient light sensor (ALS) of the conventional monitoring apparatus cannot provide correct illuminated determination in all conditions, and the ambient light sensor (ALS) increases hardware cost and damage risks of the conventional monitoring apparatus. Design of a day-mode-night-mode switching method capable of accurately identifying the supplemental light percentage in the monitoring image and accordingly switching the monitoring apparatus into the day mode or the night mode for decreasing cost in a software manner is an important issue in the monitoring industry.

SUMMARY OF THE INVENTION

The present invention provides a day-mode-night-mode switching method and a related monitoring camera apparatus capable of matching with all kind of environment for solving above drawbacks.

According to the claimed invention, a day-mode-night-mode switching method is applied to a monitoring camera apparatus for switching the monitoring camera apparatus into a day mode or a night mode. The monitoring camera apparatus is electrically connected to a supplemental lighting apparatus adapted to emit a light within a specific spectrum for light compensation. The day-mode-night-mode switching method includes acquiring an equivalent exposure parameter of the monitoring camera apparatus, determining whether the equivalent exposure parameter conforms to a first mode switching condition when the monitoring camera apparatus is in the night mode, computing a light compensation exposure parameter of image content acquired by the monitoring camera apparatus and relevant to the specific spectrum of the supplemental lighting apparatus when the equivalent exposure parameter conforms to the first mode switching condition, utilizing a compensation parameter acquired by the light compensation exposure parameter to transform the equivalent exposure parameter into a predicted exposure parameter, and determining whether the predicted exposure parameter conforms to the first mode switching condition, and then keeping the monitoring camera apparatus in the night mode or switching the monitoring camera apparatus into the day mode according to a determination result.

According to the claimed invention, a monitoring camera apparatus includes an image receiver and an operational processor. The image receiver is adapted to acquire image content relevant to a monitoring region. The operational processor is electrically connected to the image receiver, and adapted to acquire an equivalent exposure parameter of the monitoring camera apparatus, determine whether the equivalent exposure parameter conforms to a first mode switching condition when the monitoring camera apparatus is in the night mode, compute a light compensation exposure parameter of the image content relevant to a specific spectrum of a supplemental lighting apparatus when the equivalent exposure parameter conforms to the first mode switching condition, utilize a compensation parameter acquired by the light compensation exposure parameter to transform the equivalent exposure parameter into a predicted exposure parameter, and determine whether the predicted exposure parameter conforms to the first mode switching condition and then keep the monitoring camera apparatus in the night mode or switch the monitoring camera apparatus into the day mode according to a determination result.

According to the claimed invention, a day-mode-night-mode switching method is applied to an optical filter for switching a filter switching module into a day mode or a night mode according to an equivalent exposure parameter of the filter switching module. The day-mode-night-mode switching method determining whether the equivalent exposure parameter conforms to a first mode switching condition when the filter switching module is in the night mode, computing a light compensation exposure parameter relevant to the filter switching module when the equivalent exposure parameter conforms to the first mode switching condition, utilizing a compensation parameter acquired by the light compensation exposure parameter to transform the equivalent exposure parameter into a predicted exposure parameter, and determining whether the predicted exposure parameter conforms to the first mode switching condition, and then keeping the filter switching module in the night mode or switching the filter switching module into the day mode according to a determination result.

The day-mode-night-mode switching method and the monitoring camera apparatus of the present invention can estimate whether the environment has sufficient illumination, whether the monitoring camera apparatus is needed to switch into the night mode or the day mode, whether the supplemental lighting apparatus related to the monitoring camera apparatus is needed to actuate for light compensation, and how many percentage in the image content resulted by the mixed light source is provided by the supplemental lighting apparatus. Generally, the monitoring camera apparatus is disposed under the eaves of building. Even in the sunshine, the monitoring camera apparatus may be sheltered by the eaves and switched into the night mode because of misjudgment of the intensity of environmental brightness; meanwhile, the image content is affected by the supplemental lighting apparatus, which results in distorted or missed details in the image content. Thus, the present invention discloses the day-mode-night-mode switching method capable of matching with all kind of environment. The day-mode-night-mode switching method can accurately detect and analyze features of the supplemental light source in the image content, so as to correctly switch the monitoring camera apparatus into the night mode or the day mode, and to ensure that the monitoring camera apparatus is not switched into an inappropriate operation mode by interference of the supplemental light source.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
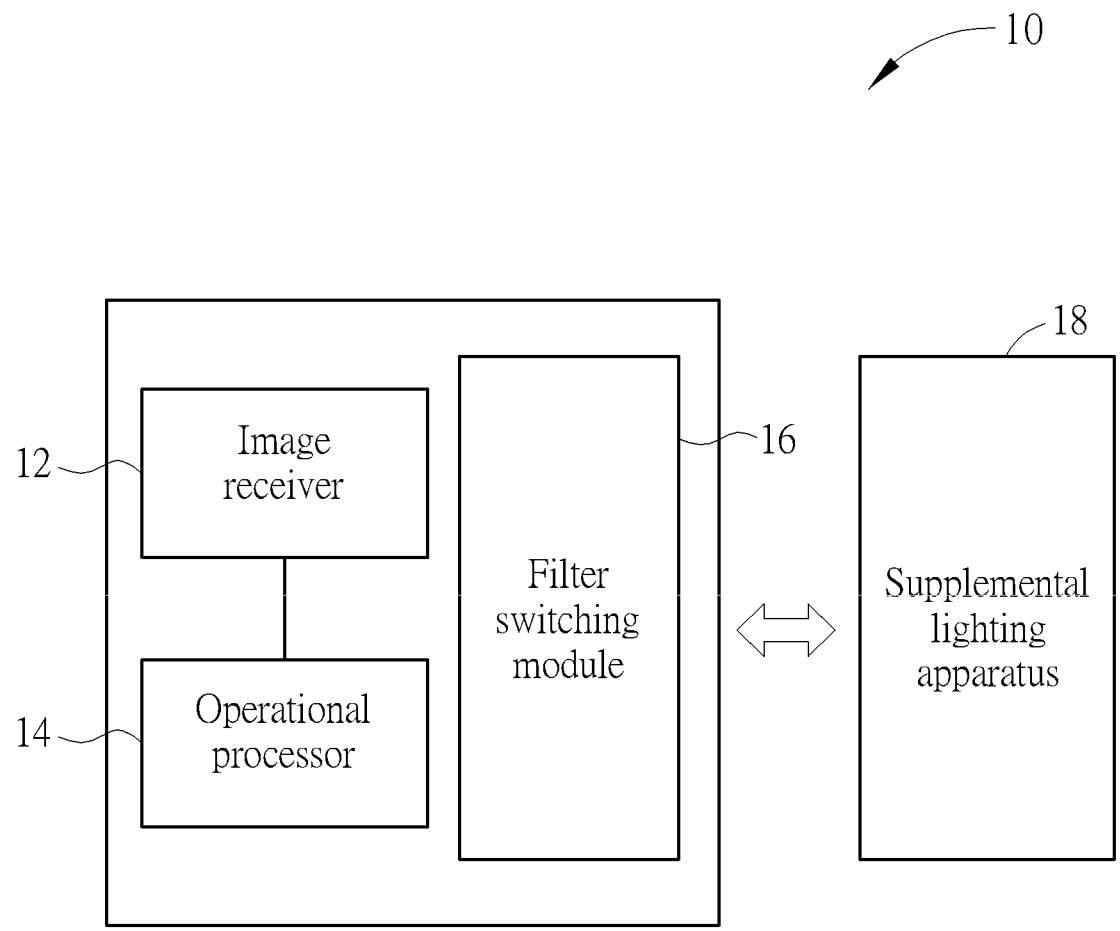
FIG. 1 is a functional block diagram of a monitoring camera apparatus according to an embodiment of the present invention.
Figure 2:
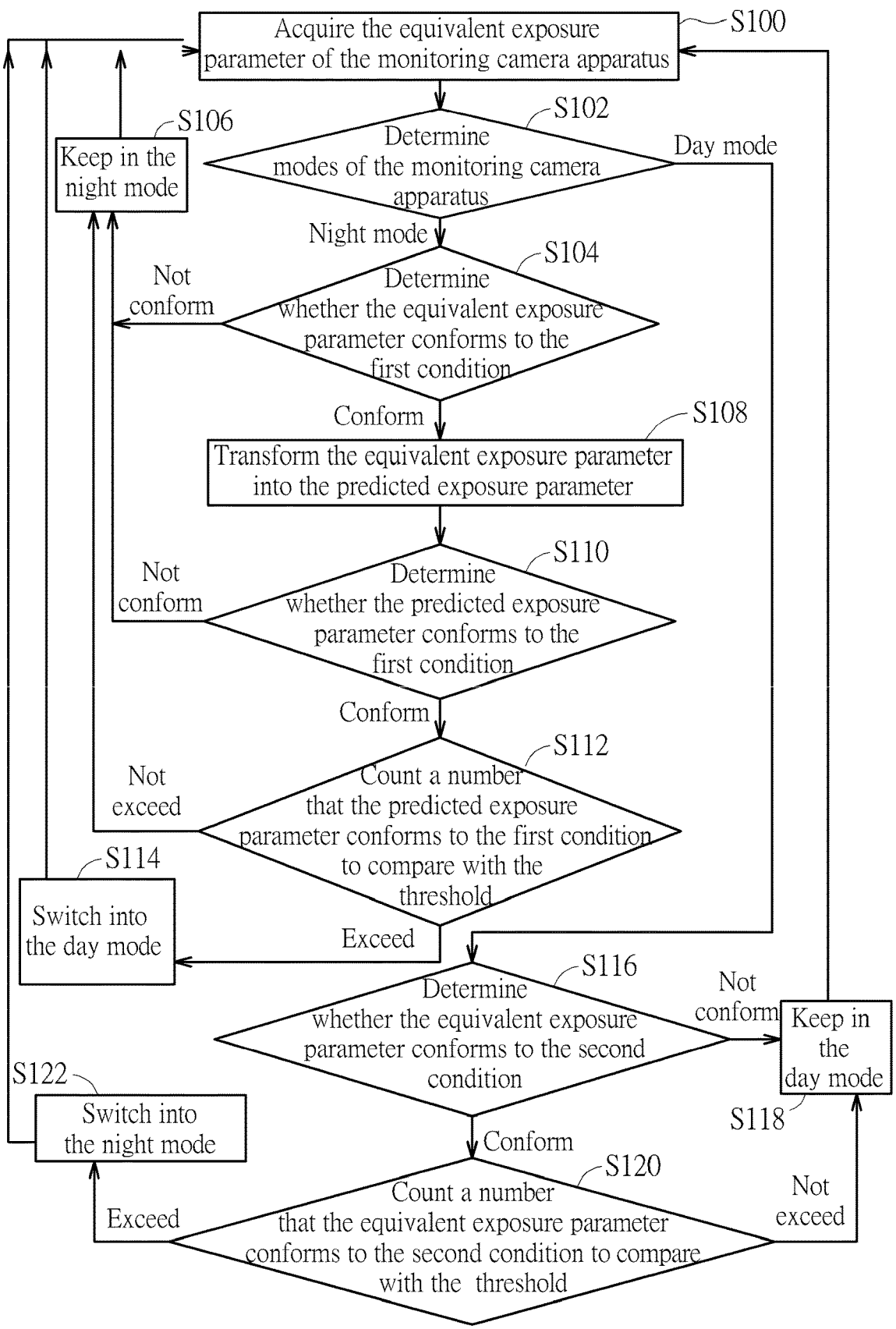
FIG. 2 is a flow chart of a day-mode-night-mode switching method according to the embodiment of the present invention.
Figure 3:
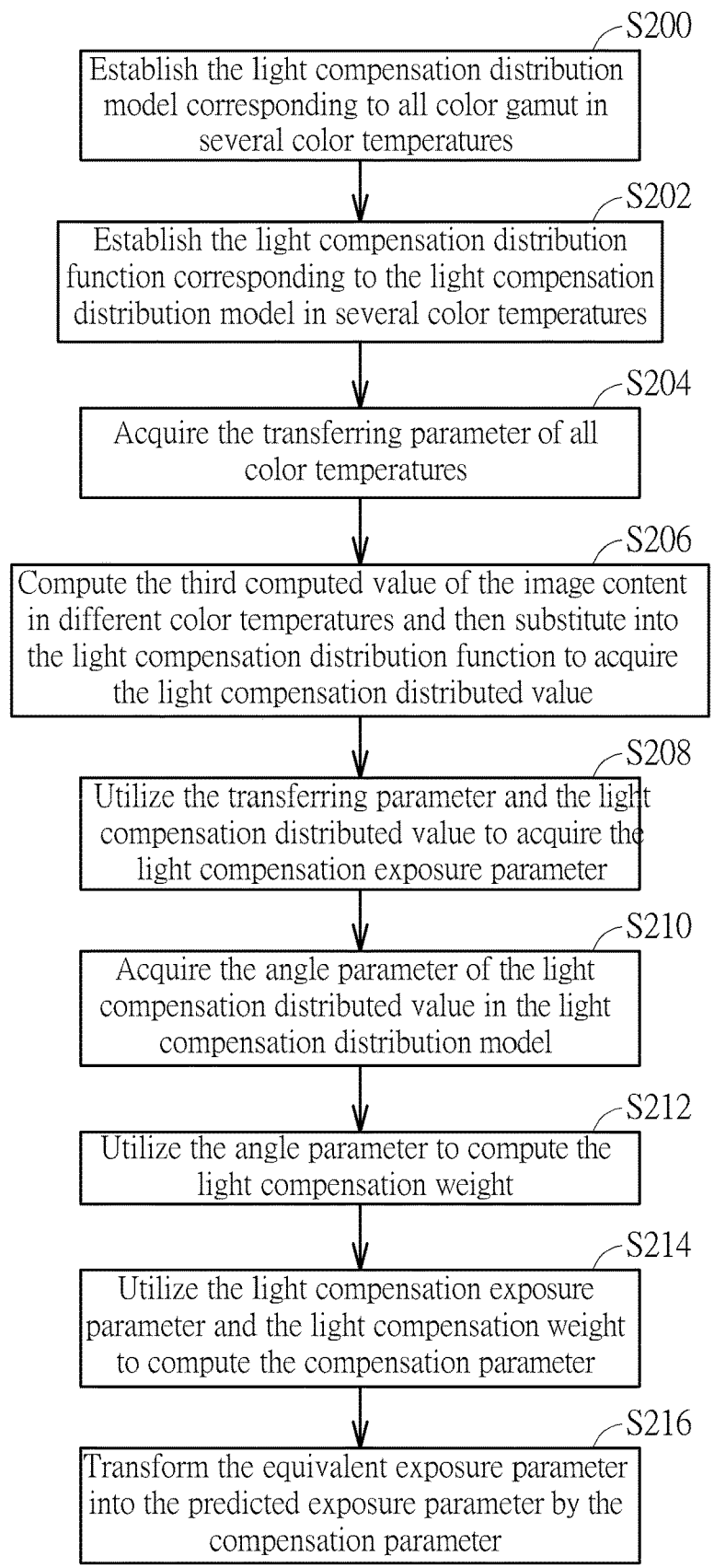
FIG. 3 is a flow chart of transforming exposure parameters by the day-mode-night-mode switching method according to the embodiment of the present invention.

Please refer to FIG. 1 to FIG. 3. FIG. 1 is a functional block diagram of a monitoring camera apparatus 10 according to an embodiment of the present invention. FIG. 2 is a flow chart of a day-mode-night-mode switching method according to the embodiment of the present invention. FIG. 3 is a flow chart of transforming exposure parameters by the day-mode-night-mode switching method according to the embodiment of the present invention. The day-mode-night-mode switching method illustrated in FIG. 2 and FIG. 3 can be suitable for the monitoring camera apparatus 10 shown in FIG. 1. The monitoring camera apparatus 10 can include an image receiver 12 and an operational processor 14 electrically connected to each other. The image receiver 12 can acquire image content relevant to a monitoring region of the monitoring camera apparatus 10. The operational processor 14 can analyze the image content and execute the day-mode-night-mode switching method of the present invention.

The monitoring camera apparatus 10 can be set in outdoor or indoor, and electrically connected to a supplemental lighting apparatus 18 for light compensation when the place where the monitoring camera apparatus 10 is set does not have sufficient intensity. In the embodiment, an invisible beam, such as an infrared beam, can be used as the supplemental light source, but the actual light source is not limited to this, which depends on an actual demand. In other possible embodiments, the supplemental lighting apparatus may use a light source within other optical spectrum. When the monitoring camera apparatus 10 is in a day mode, the image receiver 12 can receive the visible beam to acquire the image content; when the monitoring camera apparatus 10 is in a night mode, the monitoring camera apparatus 10 can actuate the supplemental lighting apparatus 18 to emit the infrared beam for the light compensation, so as to acquire the clear image content. The day-mode-night-mode switching method of the present invention can be applied for the monitoring camera apparatus 10, which means the day-mode-night-mode switching method can determine whether the image receiver 12 of the monitoring camera apparatus 10 receives the infrared beam in accordance with a determination result of the day mode and the night mode.

In addition, the invisible beam such as the infrared beam, is used as the supplemental light source in the embodiment, so that the monitoring camera apparatus 10 can optionally include an infrared filter switching module 16. In other possible embodiment, if the supplemental lighting apparatus uses the light source within other optical spectrum, the monitoring camera apparatus 10 may optionally include a filter switching module 16 applied for the said optical spectrum. The day-mode-night-mode switching method of the present invention can be suitable for the infrared filter switching module 16, and can determine whether to actuate or shut down the infrared filter switching module 16 for receiving or filtering the infrared beam according to the determination result of the day mode and the night mode.

Therefore, the day-mode-night-mode switching method of the monitoring camera apparatus 10 can shut down the infrared filter switching module 16, such as moving the infrared optical filter to position away from an optical path between the infrared light source and the image receiver 12, and then the image receiver 12 can receive the infrared beam to switch the monitoring camera apparatus 10 into the night mode. Besides, the day-mode-night-mode switching method can actuate the infrared filter switching module 16 to move the infrared optical filter to position overlapped the optical path between the infrared light source and the image receiver 12; the image receiver 12 cannot receive the infrared beam due to block of the infrared optical filter, which means the monitoring camera apparatus 10 is switched into the day mode.

For the day-mode-night-mode switching method, steps S100 and S102 are executed to acquire an equivalent exposure parameter G1 of the monitoring camera apparatus 10, and determine whether the monitoring camera apparatus 10 is in the day mode or the night mode. If the monitoring camera apparatus 10 is in the night mode, such as shutting down the infrared filter switching module 16 to allow the infrared beam passed, step S104 is executed to determine whether the equivalent exposure parameter G1 conforms to a first mode switching condition. If the equivalent exposure parameter G1 does not conform to the first mode switching condition, step S106 is executed to keep the monitoring camera apparatus 10 in the night mode and to acquire another equivalent exposure parameter G1. If the equivalent exposure parameter G1 conforms to the first mode switching condition, step S108 is executed to transform the equivalent exposure parameter G1 into a predicted exposure parameter G2.

The equivalent exposure parameter G1 can be selected from a group consisted of a current compensated value (which is symbolized as Current_gain), an exposure compensated value (which is symbolized as Expo_com), a diaphragm compensated value (which is symbolized as Iris_com), an intensity compensated value (which is symbolized as Bri_com), and a combination thereof, as formula 1. The exposure compensated value (Expo_com) can be a computation result between a maximal exposure value (which is symbolized as Max_expo) and a current exposure value (which is symbolized as Current_expo), as formula 2. The diaphragm compensated value (Iris_com) can be a computation result between a current diaphragm unit (which is symbolized as Cur_fn) and a maximal diaphragm unit (which is symbolized as Max_fn), as formula 3. The intensity compensated value (Bri_com) can be a computation result between a current intensity mean value (which is symbolized as Cur_bright_avg) and an intensity target value (which is symbolized as Bright_target), as formula 4.

$$G1 = Current\_gain - (Expo\_com + Iris\_com + Bri\_com) \quad \text{Formula 1}$$

$$Expo\_com = 20 \times \log 10(Max\_expo/Current\_expo) \quad \text{Formula 2}$$

$$Iris\_com = 20 \times \log 10[(Cur\_fn \times Cur\_fn)/(Max\_fn \times Max\_fn)] \quad \text{Formula 3}$$

$$Bri\_com = 20 \times \log 10(Cur\_bright\_avg/Bright\_target) \quad \text{Formula 4}$$

In steps S104, S106 and S108, the first mode switching condition can be defined as a switching threshold of switching the monitoring camera apparatus 10 from the night mode into the day mode. If the equivalent exposure parameter G1 is greater than or equal to the switching threshold, intensity of environmental brightness is not in need of adjustment, the monitoring camera apparatus 10 can be kept in the night mode. If the equivalent exposure parameter G1 is smaller than the switching threshold, the intensity of environmental brightness is inappropriate and in need of adjustment; however, the monitoring camera apparatus 10 can firstably utilize the day-mode-night-mode switching method of the present invention to analyze a ratio of the visible beam to the infrared beam in the image content, and determines whether to switch an operation mode of the monitoring camera apparatus 10 accordingly.

Thus, when step S108 is completed, step S110 is continuously executed to determine whether the predicted exposure parameter G2 conforms to the first mode switching condition. If the predicted exposure parameter G2 does not conform to the first mode switching condition, step S106 can be executed; if the predicted exposure parameter G2 conforms to the first mode switching condition, step S112 is executed to count a number of times that the predicted exposure parameter G2 conforms to the first mode switching condition, and compare the number of times with a counting threshold. If the foresaid number of times does not exceed the counting threshold, the monitoring region of the monitoring camera apparatus 10 can be considered as being affected temporarily, such as blaze scintilla or impermanent blind of camera, so step S106 can be executed. If the foresaid number of times reaches or exceeds the counting threshold, the intensity of environmental brightness of the place where the monitoring camera apparatus 10 is set can be considered as having obvious and sustained change, so that step S114 is executed to switch the monitoring camera apparatus 10 into the day mode, and actuate the infrared filter switching module 16 to prevent the infrared beam from passing; in the meantime, the foresaid number of times can be optionally zeroed, and another equivalent exposure parameter G1 can be acquired by the monitoring camera apparatus 10 at a following point of time for determining whether the monitoring camera apparatus 10 is kept in the day mode or switched back into the night mode.

If step S102 determines that the monitoring camera apparatus 10 is in the day mode, step S116 is executed to determine whether the equivalent exposure parameter G1 conforms to a second mode switching condition. If the equivalent exposure parameter G1 does not conform to the second mode switching condition, the intensity of environmental brightness is not in need of adjustment, step S118 is executed to keep the monitoring camera apparatus 10 in the day mode and further acquire another equivalent exposure parameter G1. If the equivalent exposure parameter G1 conforms to the second mode switching condition, the intensity of environmental brightness is inappropriate and in need of adjustment, so that step S120 is executed to count a number of times that the equivalent exposure parameter G1 conforms to the second mode switching condition, and compare the foresaid number of times with the counting threshold. If the number of times does not exceed the counting threshold, step S118 can be executed. If the number of times reaches or exceeds the counting threshold, step S122 is executed to switch the monitoring camera apparatus 10 into the night mode, and further shut down the infrared filter switching module 16 to allow the infrared beam passed; in the meantime, the foresaid number of times may be optionally zeroed, and then another equivalent exposure parameter G1 at the following point of time can be acquired by the monitoring camera apparatus 10

Figure 4:
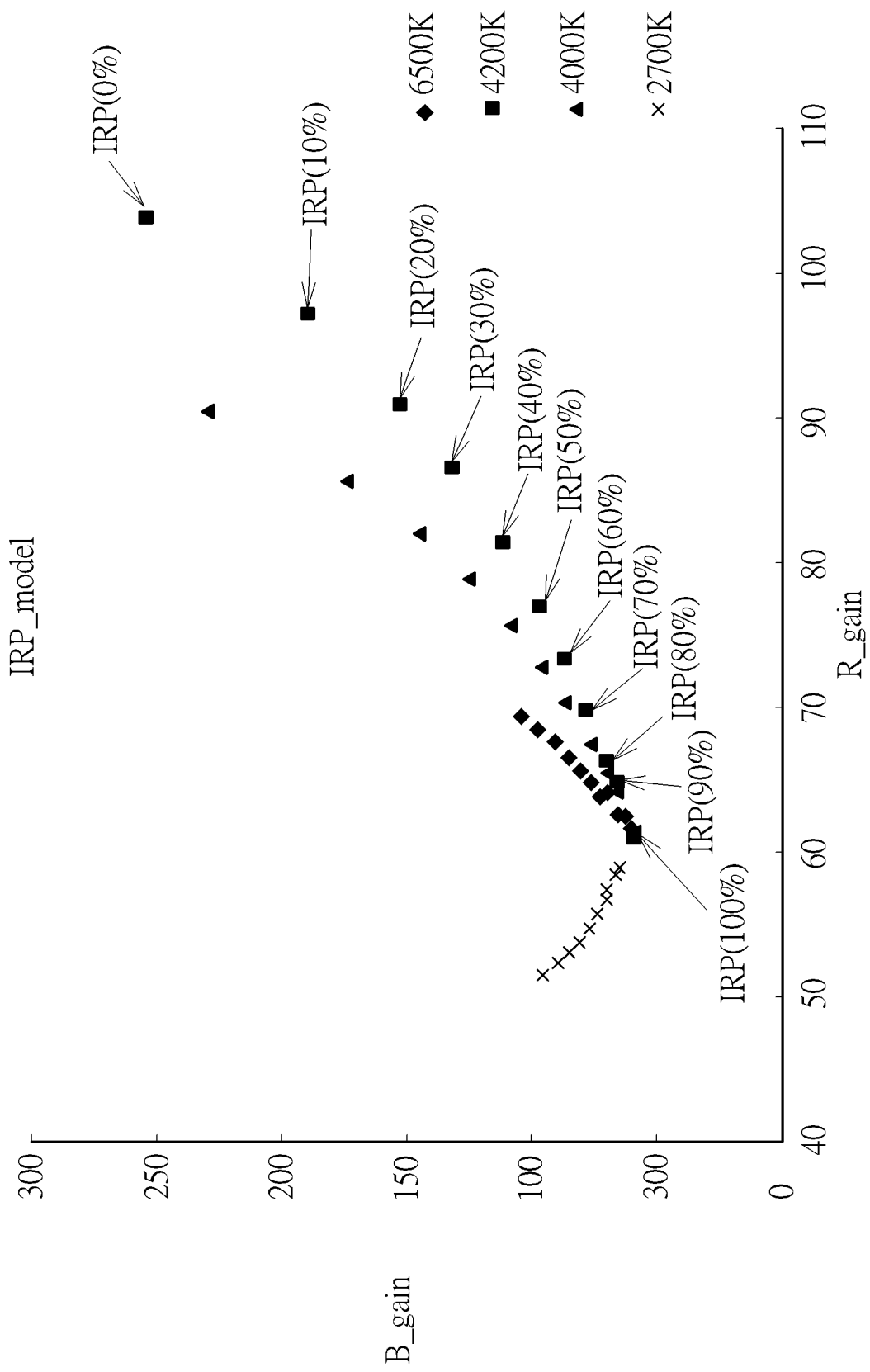
FIG. 4 is a diagram of a light compensation distribution model according to the embodiment of the present invention.
Figure 5:
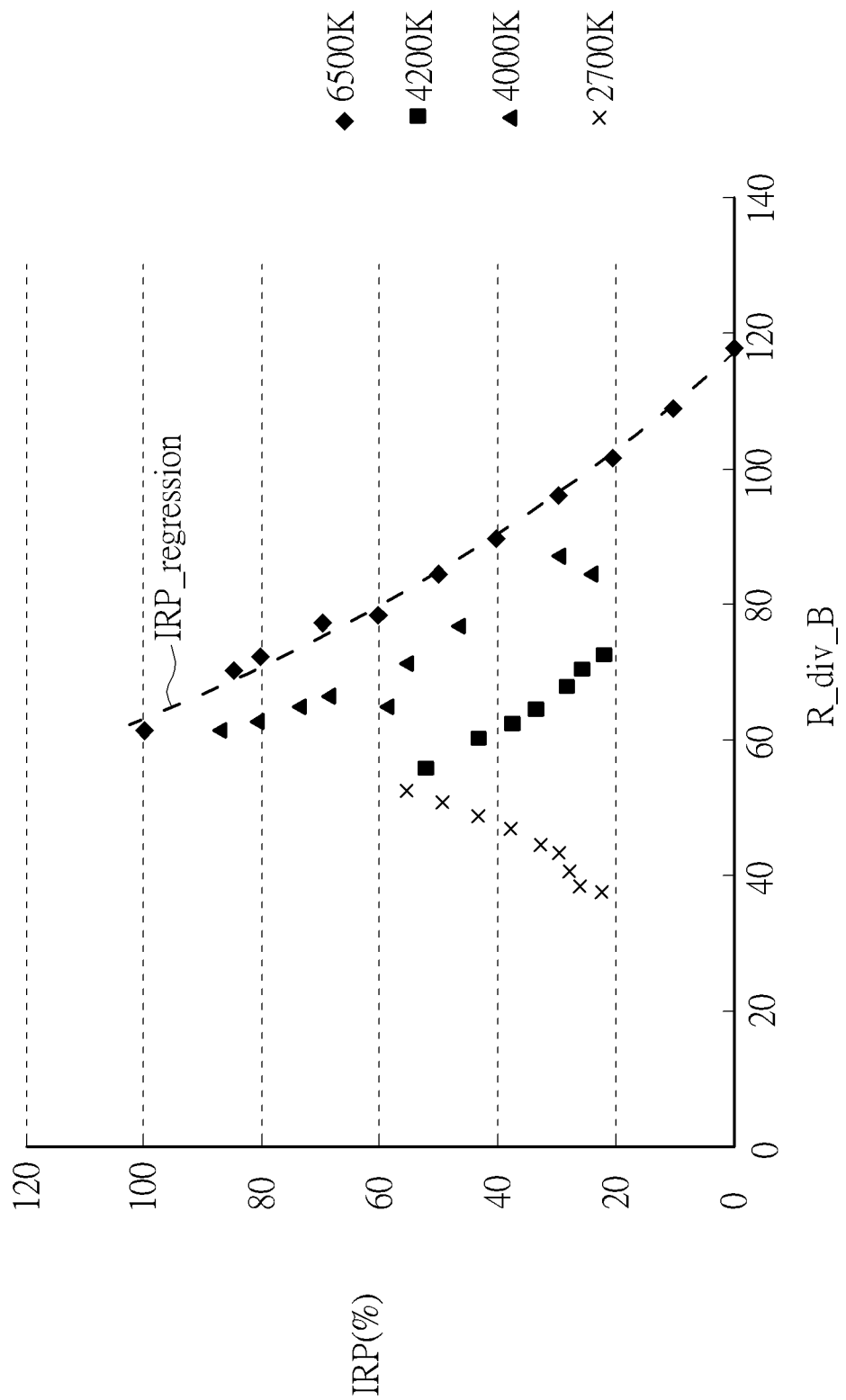
FIG. 5 is a diagram of a light compensation distribution function according to the embodiment of the present invention.

Transformation of the equivalent exposure parameter G1 and the predicted exposure parameter G2 in step S108 can be finished via process illustrated in FIG. 3. Please refer to FIG. 3 to FIG. 5. FIG. 4 is a diagram of a light compensation distribution model (which is symbolized as IRP_model) according to the embodiment of the present invention. FIG. 5 is a diagram of a light compensation distribution function (which is symbolized as IRP_regression) according to the embodiment of the present invention. In the embodiment of the present invention, an infrared light source can be applied as the supplemental light source, and therefore the light compensation distribution model can be interpreted as an infrared radiation probability module, which is symbolized as IRP_model accordingly; however, it should be mentioned that other kinds of light source also can be used as the supplemental light source, which is not limited to the infrared light source of the above-mentioned embodiment. First, step S200 is executed to establish the light compensation distribution model (IRP_model) of the supplemental lighting apparatus 18 (or the monitoring camera apparatus 10) corresponding to all color gamut in several color temperatures by experience data. The present invention is based on the red color gamut (R), the green color gamut (G) and the blue color gamut (B) of the image content; the present invention can compute a first computed value (which is symbolized as R_gain) of the first color gamut (G) and the second color gamut (R), and compute a second computed value (which is symbolized as B_gain) of the first color gamut (G) and the third color gamut (B), and further utilize three color gamut (R/G/B) and four color temperature (such as the first color temperature 6500K, the second color temperature 4200 K, the third color temperature 4000 K and the fourth color temperature 2700K) to acquire relation between the first computed value (R_gain), the second computed value (B_gain) and the light compensation distributed value (IRP) in the four color temperatures, for establishing the light compensation distribution model (IRP_model).

Then, step S202 is executed to acquire a third computed value (which is symbolized as R_div_B) by the first computed value (R_gain) and the second computed value (B_gain), and acquire the light compensation distribution function (IRP_regression) relevant to the third computed value (R_div_B) and the light compensation distributed value (IRP). In the embodiment of the present invention, the first computed value (R_gain) and the second computed value (B_gain) can be respectively set as a transverse axis and a longitudinal axis of the light compensation distribution model (IRP_model), and the third computed value R_div_B can set as the transverse axis of the light compensation distribution function (IRP_regression), which depend on the actual demand. For example, the first computed value can be transformed by the third color gamut (B) and the first color gamut (G), and the second computed value can be transformed by the third color gamut (B) and the second color gamut (R), and accordingly the third computed value can be relation between the first color gamut (G) and the second color gamut (R). Variation of the foresaid three computed values depends on the design demand. Moreover, the present invention can choose four color temperatures to establish the light compensation distribution model (IRP_model) and the light compensation distribution function (IRP_regression) according to the actual demand; however, values and amounts of the color temperature are not limited to the above-mentioned embodiment.

Then, step S204 is executed that the day-mode-night-mode switching method detects a scale of the infrared beam in all color temperatures of the intensity of environmental brightness, and acquires a transferring parameter (which is symbolized as Shift_gain) of each color temperature. For example, the transferring parameter (Shift_gain) can be interpreted as an intensity increasing quantity generated by the monitoring camera apparatus 10 switched from the day mode into the night mode, or interpreted as the scale or percentage of the infrared beam in the original color temperature of the intensity of environmental brightness. Then, steps S206 and S208 are executed that the day-mode-night-mode switching method computes the third computed value (R_div_B) of the image content acquired by the monitoring camera apparatus 10 in different color temperatures, and acquires the light compensation distributed value (IRP) by substituting the third computed value of the image content into the light compensation distribution function (IRP_regression), and utilizes the transferring parameter (Shift_gain) and the light compensation distributed value (IRP) to acquire the light compensation exposure parameter (IR_gain) via formula 5. The present invention defines the four color temperatures in the foresaid illustration, and thus four transferring parameters (Shift_gain) and four light compensation exposure parameters (IR_gain) can be computed accordingly.

$$IR\_gain = 20 \times \log 10(1/(1-IRP)) + Shift\_gain \quad \text{Formula 5}$$

Please refer to the light compensation distribution model (IRP_model) shown in FIG. 4. As an example of the second color temperature 4200K, eleven square symbols, which are arranged from the bottom to the top in sequence, can respectively represent distributed probability of the light compensation distributed values IRP(100%), IRP(90%), IRP(80%), IRP(70%), IRP(60%), IRP(50%), IRP(40%), IRP(30%), IRP(20%), IRP(10%) and IRP(0%); further, eleven corresponding symbols about each of the first color temperature 6500K, the third color temperature 4000K and the fourth color temperature 2700K can have the same distributed probability and the same sequence as ones of the square symbols about the second color temperature 4200K. The monitoring camera apparatus 10 can substitute the image content acquired in the said color temperature into the light compensation distribution model (IRP_model) to acquire the light compensation distributed value (IRP), and then compare the light compensation distributed value (IRP) with extreme distributed probability in the said color temperature, so as to execute step S210 for acquiring the angle parameter (Ang). As described in formula 6, the angle parameter (Ang) can be computed via interpolation or any other possible equations. Definition of the first computed value (R_gain) and the second computed value (B_gain) are mentioned as above. A symbol (PuR_gain) can represent values of the first color gamut (G) and the second color gamut (R) in the full infrared environment; a symbol (PuB_gain) can represent values of the first color gamut (G) and the third color gamut (B) in the full infrared environment.

$$Ang = a\cos[(R\_gain - PuR\_gain)/\text{sqrt}((R\_gain - PuR\_gain)2 + (B\_gain - PuB\_gain)2)] \times 180/\pi \quad \text{Formula 6}$$

Then, step S212 is executed to acquire a maximal distributed value (Angle_max) and a minimal distributed value (Angle_min) of each color temperature in the light compensation distribution model (IRP_model), and utilize the angle parameter (Ang), the maximal distributed value (Angle_max) and the minimal distributed value (Angle_min) to compute the light compensation weight (IR_weighting), as formula 7. Final, steps S214 and S216 are executed to set a computation result of the light compensation exposure parameter (IR_gain) and the light compensation weight (IR_weighting) as the compensation parameter (IR_com), as formula 8; further, the compensation parameter (IR_com) can be used to transform the equivalent exposure parameter (G1) into the predicted exposure parameter (G2), as formula 9.

$$IR\_weighting = 1 - (Angle\_min - Ang)/(Angle\_max - Angle\_min) \quad \text{Formula 7}$$

$$IR\_com = (\Sigma IR\_weighting \times IR\_gain)/\Sigma IR\_weighting \quad \text{Formula 8}$$

$$G2 = G1 + IR\_com \quad \text{Formula 9}$$

In conclusion, the day-mode-night-mode switching method and the monitoring camera apparatus of the present invention can estimate whether the environment has sufficient illumination, whether the monitoring camera apparatus is needed to switch into the night mode or the day mode, whether the supplemental lighting apparatus related to the monitoring camera apparatus is needed to actuate for light compensation, and how many invisible percentage in the image content resulted by the mixed light source is provided by the supplemental lighting apparatus. Generally, the monitoring camera apparatus is disposed under the eaves of building. Even in the sunshine, the monitoring camera apparatus may be sheltered by the eaves and switched into the night mode because of misjudgment of the intensity of environmental brightness; meanwhile, the image content is affected by the supplemental lighting apparatus, which results in distorted or missed details in the image content. Thus, the present invention discloses the day-mode-night-mode switching method capable of matching with all kind of environment. The day-mode-night-mode switching method can accurately detect and analyze features of the supplemental light source in the image content, so as to correctly switch the monitoring camera apparatus into the night mode or the day mode, and to ensure that the monitoring camera apparatus is not switched into an inappropriate operation mode by interference of the supplemental light source.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A day-mode-night-mode switching method applied to a monitoring camera apparatus in several color temperatures for switching the monitoring camera apparatus into a day mode or a night mode, the monitoring camera apparatus being electrically connected to a supplemental lighting apparatus adapted to emit a light within a specific spectrum for light compensation, the day-mode-night-mode switching method comprising:
   acquiring an equivalent exposure parameter of the monitoring camera apparatus;
   determining whether the equivalent exposure parameter conforms to a first mode switching condition when the monitoring camera apparatus is in the night mode;
   computing a light compensation exposure parameter of image content acquired by the monitoring camera apparatus and relevant to the specific spectrum of the supplemental lighting apparatus when the equivalent exposure parameter conforms to the first mode switching condition;
   computing a light compensation weight of the light compensation exposure parameter in each of the color temperatures to generate a compensation parameter;
   utilizing the compensation parameter to transform the equivalent exposure parameter into a predicted exposure parameter; and
   determining whether the predicted exposure parameter conforms to the first mode switching condition, and then keeping the monitoring camera apparatus in the night mode or switching the monitoring camera apparatus into the day mode according to a determination result.

2. The day-mode-night-mode switching method of claim 1, wherein an invisible beam is filtered in response to the monitoring camera apparatus switched into the day mode, and the invisible beam is received in response to the monitoring camera apparatus switched into the night mode.

3. The day-mode-night-mode switching method of claim 1, further comprising:
   keeping the monitoring camera apparatus in the night mode and acquiring another equivalent exposure parameter when the equivalent exposure parameter does not conform to the first mode switching condition.

4. The day-mode-night-mode switching method of claim 1, further comprising:
   counting a number of times that the predicted exposure parameter conforms to the first mode switching condition;
   determining whether the number of times exceeds a counting threshold; and
   switching the monitoring camera apparatus into the day mode when the number of times exceeds the counting threshold.

5. The day-mode-night-mode switching method of claim 4, wherein the monitoring camera apparatus is kept in the night mode and another equivalent exposure parameter is acquired when the number of times does not exceed the counting threshold.

6. The day-mode-night-mode switching method of claim 1, wherein the equivalent exposure parameter is selected from a group consisted of a current compensated value, an exposure compensated value, a diaphragm compensated value, an intensity compensated value, and a combination thereof.

7. The day-mode-night-mode switching method of claim 1, further comprising:
   establishing a light compensation distribution model about the spectrum of the supplemental lighting apparatus related to all color gamut in different color temperatures;
   utilizing the light compensation distribution model to acquire the light compensation exposure parameter and the related light compensation weight of each of the color temperatures; and
   setting a computation result of the light compensation exposure parameter and the light compensation weight as the compensation parameter.

8. The day-mode-night-mode switching method of claim 7, wherein the image content acquired by the monitoring camera apparatus has a first color gamut, a second color gamut and a third color gamut, the day-mode-night-mode switching method computes a first computed value of the first color gamut and the second color gamut and a second computed value of the first color gamut and the third color gamut, and utilizes relation between the first computed value, the second computed value and a light compensation distributed value to establish the light compensation distribution model.

9. The day-mode-night-mode switching method of claim 8, wherein a third computed value is acquired by the first computed value and the second computed value, and a distribution function relevant to the third computed value and the light compensation distributed value is acquired accordingly.

10. The day-mode-night-mode switching method of claim 9, wherein a transferring parameter of the image content is computed, the light compensation distributed value is acquired by the image content and the distribution function, and the light compensation exposure parameter is acquired by the transferring parameter and the light compensation distributed value.

11. The day-mode-night-mode switching method of claim 8, wherein the light compensation distributed value is acquired by substituting the image content into the light compensation distribution model, an angle parameter of the light compensation distributed value relative to a maximal distributed value and a minimal distributed value of the light compensation distribution model is computed, and the light compensation weight is acquired by the angle parameter, the maximal distributed value and the minimal distributed value.

12. The day-mode-night-mode switching method of claim 1, further comprising:
   determining whether the equivalent exposure parameter conforms to a second mode switching condition when the monitoring camera apparatus is in the day mode;
   counting a number of times that the equivalent exposure parameter conforms to the second mode switching condition; and
   switching the monitoring camera apparatus into the night mode when the number of times exceeds a counting threshold.

13. The day-mode-night-mode switching method of claim 12, wherein the monitoring camera apparatus is kept in the day mode and another equivalent exposure parameter is acquired when the equivalent exposure parameter does not conform to the second mode switching condition.

14. The day-mode-night-mode switching method of claim 12, wherein the monitoring camera apparatus is kept in the day mode and another equivalent exposure parameter is acquired when the number of times does not exceed the counting threshold.

15. A monitoring camera apparatus applied in several color temperatures, comprising:
- an image receiver adapted to acquire image content relevant to a monitoring region; and
- an operational processor electrically connected to the image receiver, and adapted to acquire an equivalent exposure parameter of the monitoring camera apparatus, determine whether the equivalent exposure parameter conforms to a first mode switching condition when the monitoring camera apparatus is in the night mode, compute a light compensation exposure parameter of the image content relevant to a specific spectrum of a supplemental lighting apparatus when the equivalent exposure parameter conforms to the first mode switching condition, compute a light compensation weight of the light compensation exposure parameter in each of the color temperatures to generate a compensation parameter, utilize the compensation parameter acquired by the light compensation exposure parameter to transform the equivalent exposure parameter into a predicted exposure parameter, and determine whether the predicted exposure parameter conforms to the first mode switching condition and then keep the monitoring camera apparatus in the night mode or switch the monitoring camera apparatus into the day mode according to a determination result.

16. A day-mode-night-mode switching method applied to an optical filter in several color temperatures for switching a filter switching module into a day mode or a night mode according to an equivalent exposure parameter of the filter switching module, the day-mode-night-mode switching method comprising:
- determining whether the equivalent exposure parameter conforms to a first mode switching condition when the filter switching module is in the night mode;
- computing a light compensation exposure parameter relevant to the filter switching module when the equivalent exposure parameter conforms to the first mode switching condition;
- computing a light compensation weight of the light compensation exposure parameter in each of the color temperatures to generate a compensation parameter;
- utilizing the compensation parameter to transform the equivalent exposure parameter into a predicted exposure parameter; and
- determining whether the predicted exposure parameter conforms to the first mode switching condition, and then keeping the filter switching module in the night mode or switching the filter switching module into the day mode according to a determination result.

* * * * *